J. M. BOWMAN.
Harvester.
No. 29,119.
Patented July 10, 1860.
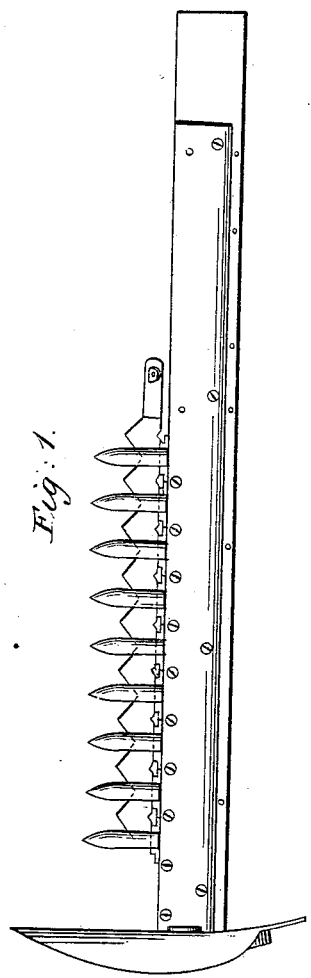
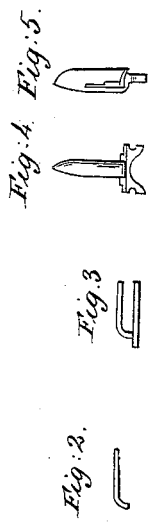
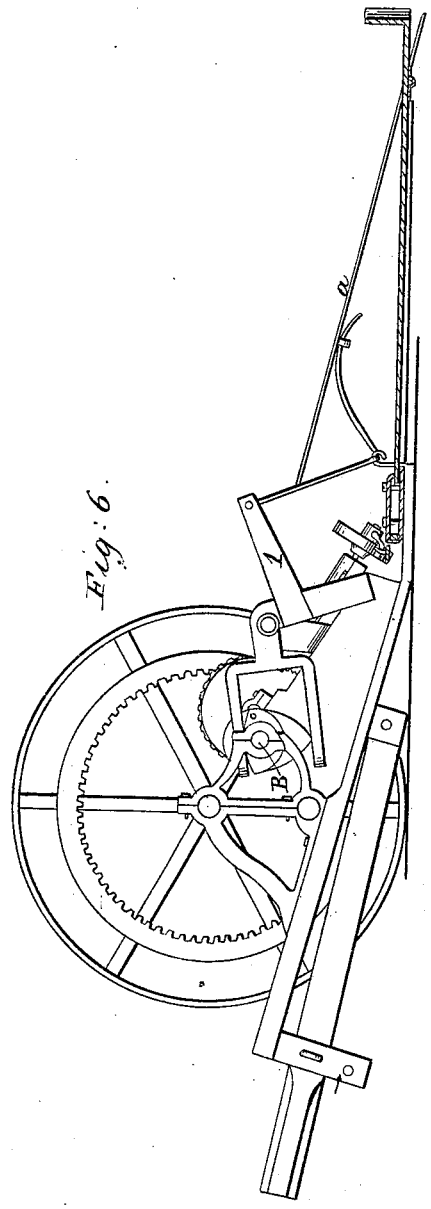
Witnesses.
Inventor

UNITED STATES PATENT OFFICE.

JOHN M. BOWMAN, OF BROCKPORT, NEW YORK, ASSIGNOR TO HUNTLEY, BOWMAN & CO., OF SAME PLACE.

IMPROVEMENT IN HARVESTING-MACHINES.

Specification forming part of Letters Patent No. 29,119, dated July 10, 1860.

*To all whom it may concern:*

Be it known that I, JOHN M. BOWMAN, of Brockport, Monroe county, in the State of New York, have invented certain new and useful improvements in the harvesting-machine for cutting all kinds of small grain and grasses; and I do hereby declare that the following is a full and exact description thereof, reference being had to the accompanying drawings, and to the letters of reference thereon.

The nature of my improvement or invention relates to the mode of forming and combining the finger-bar and the guard-fingers; second, to the manner of constructing the cutter-bar; third, to the mode of clearing the cutting apparatus of any obstructing matter; and, finally, to a mode of depositing the cut grain when the machine to which my invention may be applied is used to harvest grain, as hereinafter fully described.

That others skilled in the art may make and use my invention, I will proceed to describe its construction and mode of operation.

For the purpose of securing a strong and light finger-beam to ease the draft of the machine, simple in its construction, and which can be readily repaired in case of accident, I make it of two thin plates of metal, of equal size and of rectangular shape. The upper plate is bent down so as to form a flange on the rear side of it of the width of the thickness of the shank of the guard-finger. The two plates thus formed are firmly united by screw-bolts, so that their front edges shall be on a line leaving an opening in front of the finger-beam to insert the shanks of the guard-fingers, while the under plate projects behind the lower edge of the flange of the upper plate to form a rest for the front of a platform. A top view of the finger-beam may be seen with the guard-fingers in position in Figure 1 of the drawings. Fig. 2 is a sectional view of the upper plate of the finger-beam, and Fig. 3 is a sectional view of the finger-beam when the two plates are fastened together.

The finger is formed with a closed slot for the cutters and their bar to vibrate in. A top view of its shank is seen in Fig. 4, having a notch on its front side on either side of the guard-finger and the rear end of the shank; or that part of it which is inserted between the plates of the finger-beam is rabbeted on both sides, so as to form shoulders corresponding with the thickness of the finger-beam, and may be seen in Fig. 5; and for the purpose of further securing lightness of the machine I form the rear of the shank in the form of an arc, as may be seen in Fig. 4 of the drawings.

The series of guard-fingers when inserted in the finger-beam fill up the opening in front thereof in rear of the cutters, and the remainder of the opening in the length of the finger-beam in rear of the frame may be filled with a strip of wood or iron, and be properly fastened, and thereby secure additional strength to the finger-beam. The screw-bolts with which to fasten the plates of the finger-beam together also pass through half-circular openings on each side of the guard-fingers, which are made so as to be opposite each other, and when placed together form circular holes of the diameter of the screw-bolt holes in the plates of the finger-beam, and are so placed as to be on a line of said screw-bolt holes, and thus placed, while the screw-bolts fasten the plates firmly together, they also fasten the guard-fingers firmly in place, and thereby the finger-beam is further strengthened.

For the purpose of preventing what the farmers call "clogging," which is likely to occur in working the machine, I cut a small acute angular notch into the rear of the cutter-bar, deeper on the lower side of the bar than on the upper side, and the cutter has also a similar notch cut into it, and the cutter is fastened to the cutter-bar so that the rear of it will be on a line with the rear line of the cutter-bar, and so that the notch in the cutter-bar shall be on a perpendicular line with the notch in the cutter, and when the cutter-bar is vibrated in the motion of the machine the acute angular notches on the cutter-bar will pass the shoulders on the front of the shank of the guard-fingers against which it rests, and in its action will cut up any obstructing or clogging matter that may accumulate to clog the action of the cutter-bar, and permit it to fall or to pass over the finger-beam.

It is important when using reapers, for which this invention is also designed, to be able to deposit the cut grain out of the way of the beam and of the machine on the succeeding rounds, and to accomplish this purpose I have constructed and arranged a second platform, A, simple in character and cheap in construction, to be connected to the first platform by a round iron rod to be made fast to the second platform, which, while it serves as a support of the rear end of the second platform, shall turn under the first platform, and also serve as an axis of the second platform, said part of the rod which passes under the first platform being made to pass through certain ways, which may serve as hinges, and when put in position its escape therefrom is prevented by a short screw-bolt, which is made to pass into its lower surface, and which shall serve to keep it in place while the front end of the said second platform is rested on the projection of the lower plate of the finger-beam. Being placed at the delivery end of the first platform, where the cut grain is delivered by a rake, however operated, the front end of the second platform is elevated by a lever, A, connected to and operated by a cam on the double cam-shaft B, which is operated by its mechanical connections with the main shaft—that is to say, by a cogged wheel on the interior end of the main shaft, which plays into a cogged wheel on the inner end of the shaft B, but which are not represented in the drawings—whereby the front end of the second platform is elevated to an angle of about forty-five degrees, so that the cut grain deposited thereon by the rake is deposited at its rear, as before stated, and thereupon the second platform is instantly brought back to its horizontal position by the action of the other cam on shaft B.

For the purpose of further easing the draft of the machine, of keeping the finger-beam to the ground, and also of preventing an undue oscillation of the same in passing over uneven ground, particularly when used as a mower, I attach the pole or tongue to the lower side of the main frame, which, for a few inches in front of its connection with the finger-beam, is on a plane with it, but is thence inclined upwardly at an angle of about eighteen degrees or twenty degrees in rear of the axis of the main shaft, and so near to the line of the uncut grain as only to permit the passage of one horse, whereby to draw from a point of about equal resistance from the driving-wheel on one side and of the cutting apparatus on the other, and whereby to keep the cutter-bar close to the ground in passing over ground of unequal surfaces, and to prevent an undue oscillation of the finger-beam when the main or driving wheel shall meet unusual obstructions in its track.

Having thus stated my invention and its mode of operation, what I claim therein as new, and desire to secure by Letters Patent, is—

1. A cutter-bar with acute angular notches on the back thereof, for the purpose and substantially as described.

2. The finger-beam and guard-fingers, when constructed, connected, and operating in combination, in the manner and for the purposes specified.

3. The cutter-bar with its acute angular notches on the back thereof, in combination with the projections on the shank of the guard-finger, made and operating substantially as described.

4. The second or dumping platform, a, in combination with the mechanism for operating it and with the first platform, constructed and arranged in the manner and for the purpose substantially as described.

In testimony of which invention I have hereunto set my hand this 10th day of May, 1860.

JOHN M. BOWMAN.

Witnesses:
  DANL. HOLMES,
  R. CHICKERING.